(12) United States Patent
Matsuzaki et al.

(10) Patent No.: US 7,837,393 B2
(45) Date of Patent: Nov. 23, 2010

(54) SELF-ALIGNING ROLLER BEARING AND METHOD OF PROCESSING THE SAME

(75) Inventors: Kazumi Matsuzaki, Kanagawa (JP); Toshio Ueda, Kanagawa (JP); Koichi Nagano, Kanagawa (JP); Atsushi Yamanoue, Kanagawa (JP)

(73) Assignee: NSK Ltd., Tokyo (JP)

( * ) Notice: Subject to any disclaimer, the term of this patent is extended or adjusted under 35 U.S.C. 154(b) by 1088 days.

(21) Appl. No.: 10/572,503

(22) PCT Filed: Sep. 17, 2004

(86) PCT No.: PCT/JP2004/014030

§ 371 (c)(1),
(2), (4) Date: Mar. 17, 2006

(87) PCT Pub. No.: WO2005/028890

PCT Pub. Date: Mar. 31, 2005

(65) Prior Publication Data

US 2007/0081753 A1    Apr. 12, 2007

(30) Foreign Application Priority Data

Sep. 17, 2003    (JP)    ............................. 2003-324011

(51) Int. Cl.
*F16C 33/58* (2006.01)
*F16C 33/02* (2006.01)
*F16C 23/08* (2006.01)

(52) U.S. Cl. ........................ 384/569; 384/625; 384/548; 384/495

(58) Field of Classification Search .................. 384/448, 384/450, 492, 495, 516, 558, 565, 568–569, 384/571, 548, 625; 29/898.13, 898.063, 29/898.066

See application file for complete search history.

(56) References Cited

U.S. PATENT DOCUMENTS

| | | | | | |
|---|---|---|---|---|---|
| 1,967,650 A | * | 7/1934 | Ahmansson | ................. | 384/571 |
| 2,252,096 A | * | 8/1941 | Pew | ............................. | 451/52 |
| 3,005,297 A | * | 10/1961 | Spicacci et al. | ........ | 29/898.066 |

(Continued)

FOREIGN PATENT DOCUMENTS

JP    55-33983 A    3/1980

(Continued)

OTHER PUBLICATIONS

Japanese Office Action (with translation) (4 pages).

*Primary Examiner*—Marcus Charles
(74) *Attorney, Agent, or Firm*—Sughrue Mion, PLLC

(57)    ABSTRACT

A self-aligning roller bearing is provided which includes an inner ring having a double-row raceway, an outer ring having a double-row integral and spherical raceway, a plurality of rollers incorporated between the inner ring raceway and the outer ring raceway on a double-row basis, and a retainer for rotatably retaining the rollers. Processing marks crossing each other are formed on a raceway surface of the spherical raceway of the outer ring. The processing marks are cut substantially straightly at a predetermined crossing angle to the circumferential direction of the raceway surface. The surface roughness of the raceway surface is substantially constant in the axial direction and the circumferential direction thereof at least in a part in contact with the roller.

2 Claims, 7 Drawing Sheets

U.S. PATENT DOCUMENTS

| | | | | |
|---|---|---|---|---|
| 3,990,753 A | * | 11/1976 | Kellstrom et al. | 384/450 |
| 4,658,800 A | * | 4/1987 | Larsson | 125/11.03 |
| 5,503,481 A | * | 4/1996 | Hashimoto et al. | 384/569 |
| 5,516,324 A | * | 5/1996 | Matsuyama et al. | 451/52 |
| 5,586,826 A | | 12/1996 | Kellstrom et al. | |
| 5,642,947 A | | 7/1997 | Akamatsu et al. | |
| 5,890,815 A | * | 4/1999 | Ijuin et al. | 384/568 |
| 6,725,720 B2 | * | 4/2004 | Kiuchi et al. | 384/492 |
| 6,735,868 B2 | * | 5/2004 | Loose et al. | 29/898.13 |
| 7,435,007 B2 | * | 10/2008 | Ueda et al. | 384/516 |

FOREIGN PATENT DOCUMENTS

| | | | |
|---|---|---|---|
| JP | 57-61933 B2 | | 12/1982 |
| JP | 62-274115 A | | 11/1987 |
| JP | 1-220720 A | | 9/1989 |
| JP | 3-52417 U | | 5/1991 |
| JP | 04039414 A | * | 2/1992 |
| JP | 4-266410 A | | 9/1992 |
| JP | 4-282018 A | | 10/1992 |
| JP | 5-306719 A | | 11/1993 |
| JP | 2900527 B2 | | 3/1999 |
| JP | 11-226855 A | | 8/1999 |
| JP | 2002254293 A | * | 9/2002 |

* cited by examiner

SELF-ALIGNING ROLLER BEARING AND METHOD OF PROCESSING THE SAME

TECHNICAL FIELD

The present invention relates to a self-aligning roller bearing which can be used with a long life by suppressing friction and heat development attributable to a skew of the roller and also relates to a method of processing the same.

BACKGROUND ART

Self-aligning roller bearings are widely used as roll neck bearings of various types, bearings for vehicles, and bearings for various industrial applications.

It is known that the life of such a self-aligning roller bearing is shortened by troubles such as an increase in friction and heat generated inside the bearing which results in rolling contact fatigue when certain rollers do not rotate in a normal condition during the operation of the same, for example, in case that the roller rotates at a great negative skew angle.

Under the circumstance, various techniques have been developed to control the skew angle of a roller in operation. For example, method of processing have been proposed (see JP-B-57-61933), in which raceway surfaces of an inner ring and an outer ring are made different from each other in surface roughness (the surface roughness of the raceway surface of the outer ring is made higher than the surface roughness of the raceway surface of the inner ring).

As measures to avoid a great negative skew angle, methods have been proposed, in which at least either raceway surfaces or roller contact surfaces of inner and outer rings are provided with surface roughness which is different between parts of the surfaces in the neighborhood of the center of the bearing and parts of the surfaces in the neighborhood of sides of the bearing (see Japanese Patent No. 2900527).

One means for solving the problem included in the proposals is a configuration in which "the surface roughness of an outer ring raceway surface in parts thereof in contact with the roller located in the neighborhood of sides of the bearing is lower than the surface roughness of a part in contact with the roller located at least in the neighborhood of the center of the bearing other than the parts in contact with the roller" (see JP-A-11-226855).

DISCLOSURE OF THE INVENTION

An example of the method of processing in JP-B-57-61933 is a method in which a raceway of an inner ring is finished using a super-finishing process; a raceway surface of an outer ring is finished using a grinding process employing a cup grindstone as described in JP-A-11-226855; and the outer ring raceway surface is finished rougher than the inner ring raceway surface.

However, when a raceway surface of an outer ring is finished by grinding it with a cup grindstone, since curved processing marks 200 as shown in FIG. 7 are formed on a raceway surface 101, a phenomenon is observed, in which the population of intersections 201 between the processing marks 200 is highest at both ends 120 of the raceway surface and gradually decreases to a minimum at a central part 110 of the raceway surface.

Therefore, a measurement conducted in the axial direction of the raceway surface 101 of the outer ring finished using such a method indicates that the roughness of the raceway surface 101 of the outer ring 100 is different between the central part 110 and the both ends 120 of the raceway surface (the roughness of the both ends 120 of the raceway surface is higher than that of the central part 110 of the raceway surface) as shown in FIGS. 8(a), (b), and (c). FIGS. 8(a), (b), and (c) show the surface roughness of the left end of the raceway surface, the central part of the raceway surface, and the right end of the raceway surface, respectively. Thus, when the bearing is ground using a cup grindstone, since the surface roughness of the neighborhood of sides of the bearing is higher than that of the neighborhood of the center of the bearing because of processing marks, the bearing is in a surface condition which is likely to result in a negative skew angle according to Japanese Patent No. 2900527. Although the configuration disclosed in Japanese Patent No. 2900527 is desirable for the purpose of suppressing friction and generation of heat attributable to skew of a roller, it takes time and labor to change the degree of a difference in surface roughness between contact areas between an outer ring and a roller and to change boundaries between the areas that are different in surface roughness depending on the design specification of the bearing and the condition of use.

The invention has been made taking such a problem with the related art into consideration, and it is an object of the invention to provide a self-aligning roller bearing having a long life in which no excessive negative skew of the roller is generated and to provide a method of processing the same.

The invention provides a self-aligning roller bearing comprising an inner ring having a double-row raceway, an outer ring having a double-row integral and spherical raceway, a plurality of rollers incorporated between the inner ring raceway and the outer ring raceway on a double-row basis, and a retainer for rotatably retaining the rollers, wherein: processing marks crossing each other are formed on a raceway surface of the spherical raceway of the outer ring; the processing marks are cut substantially straightly at a predetermined crossing angle to the circumferential direction of the raceway surface; and the surface roughness of the raceway surface is substantially constant in the axial direction and the circumferential direction thereof at least in a part in contact with the roller.

Preferably, the processing marks are cut at a crossing angle in the range from 90° to 150° to the circumferential direction of the raceway surface.

Preferably, the surface roughness of the raceway surface of the outer ring is in the range from 0.15 to 0.4 μmRa in terms of average roughness at the centerline thereof in both of the radial direction and the circumferential direction. A difference in surface roughness between measurements in the axial direction A and the circumferential direction S is 0.1 μmRa or less. Skewness (Rsk) is −0.4 or less. The roughness of a raceway surface of the inner ring is 0.1 μmRa or less in terms of average roughness at the centerline in the axial direction thereof.

The invention provides a method of processing a self-aligning roller bearing comprising the step of forming processing marks crossing each other on a raceway surface of an outer ring of the self-aligning roller bearing using a super-finishing process.

Preferably, the processing marks crossing each other are cut at a crossing angle in the range from 90° to 150° to the circumferential direction of the raceway surface.

Preferably, the step of forming the processing marks includes the steps of rotating the outer ring about a center axis thereof, inserting a grindstone in the outer ring, and swinging the grindstone along the curvature of the raceway surface while pressing the raceway surface with the same.

By employing the above-described configuration, the surface roughness of the raceway surface of the outer ring is made substantially constant in both of the axial direction and the circumferential direction. Since the surface roughness of the outer ring raceway surface is higher than the surface roughness of the inner ring raceway surface, no excessive negative skew of the roller will occur. In addition, the super-finishing process compresses any residual stress on a surface and provides an effect of making any layer altered by processing thinner than those generated by grinding, which provides a long life.

BRIEF DESCRIPTION OF THE DRAWINGS

FIGS. 8(a) to (c) are graphs showing roughness of a slot (in the axial direction thereof) according to a method of processing in the prior art, FIGS. 8(a), (b), and (c) showing surface roughness of a left side, a central part, and a right side of a raceway surface, respectively.

BEST MODE FOR CARRYING OUT THE INVENTION

An embodiment of the invention will now be described based on the drawings.

Figure 1:
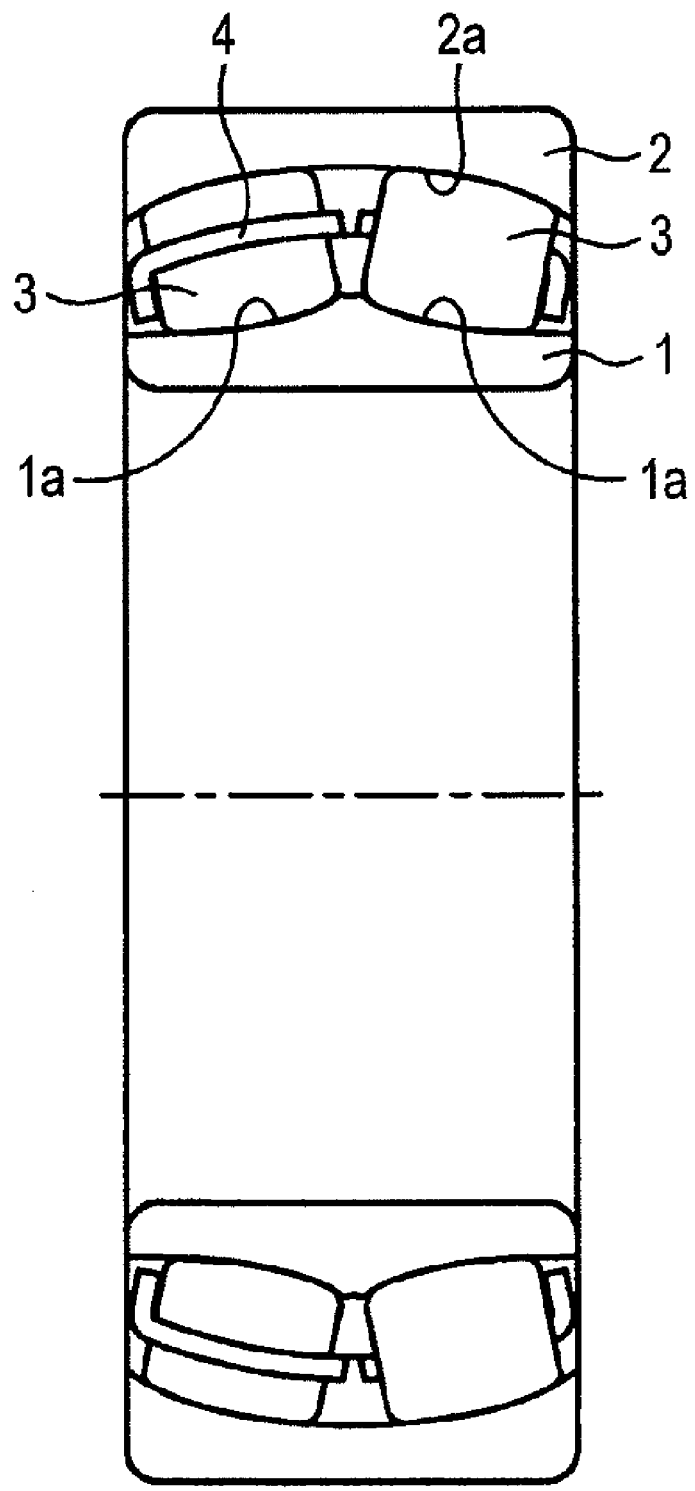
FIG. 1 is a schematic sectional view of an embodiment of the invention.

Although a self-aligning roller bearing as shown in FIG. 1 will be described by way of example in the present embodiment, self-aligning roller bearings having other configurations may be used within the scope of the invention. A self-aligning roller bearing is constituted by an inner ring 1 having a double-row raceway 1a and an outer ring 2 having a double-row integral spherical raceway 2a, a plurality of rollers 3 incorporated between the inner ring raceway 1a and the outer ring raceway 2a on a double-row basis, and a retainer 4 for rotatably retaining the rollers 3.

Since the invention involves a configuration which is characterized in that processing marks 5 crossing each other are formed on the raceway surface 2a of the outer ring 2, the description will only address those elements characteristic of the invention and will omit other elements. Design changes may be made on other elements such as the inner ring 1, outer ring 2, rollers 3, and retainer 4 as occasion demands within the scope of the invention.

Figure 2:
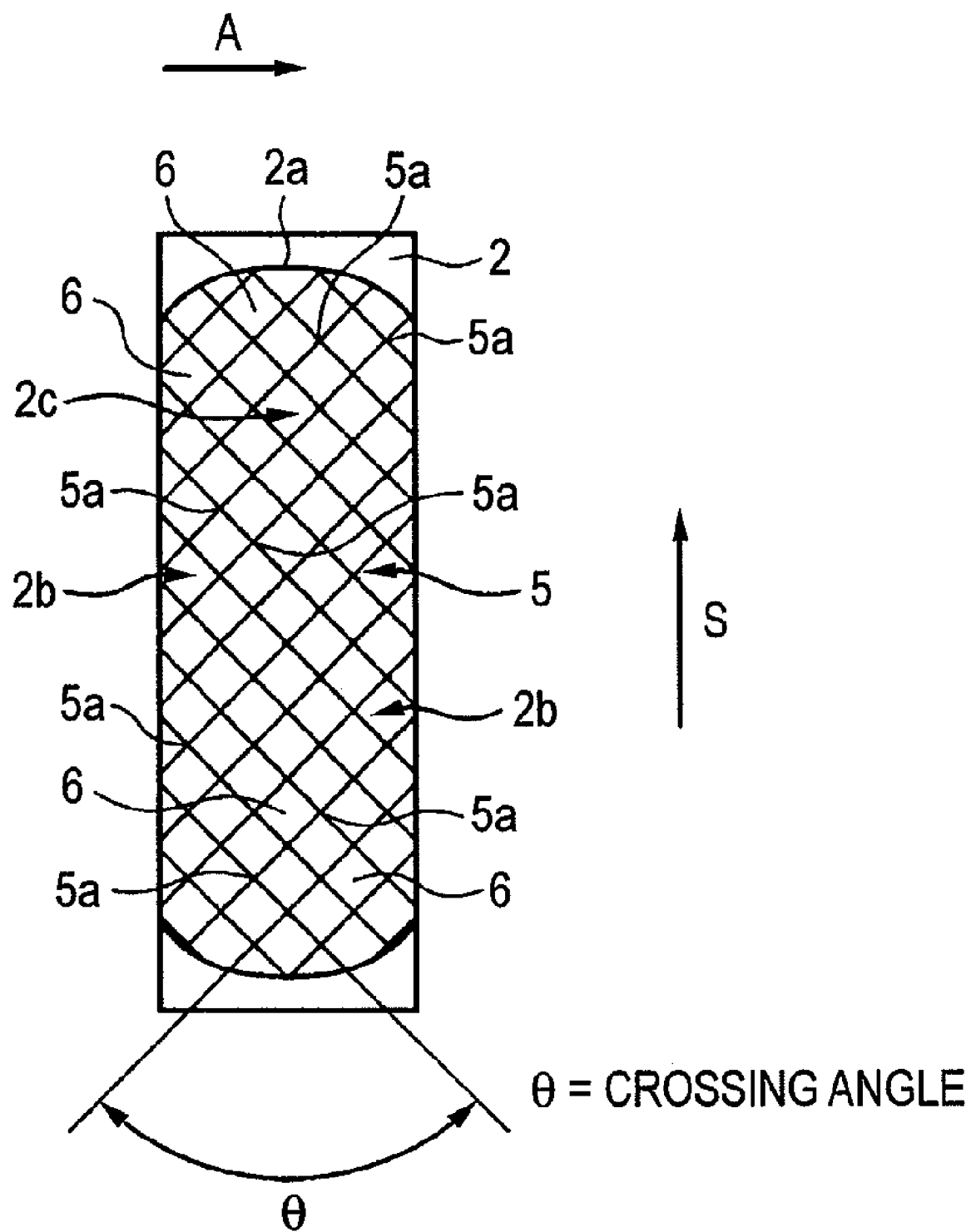
FIG. 2 is a schematic illustration of processing marks on a raceway surface of an outer ring.

The raceway surface 2a of the outer ring 2 is formed in a spherical shape continuously extending in the circumferential direction and having a desired depth and curvature (a shape that is a radial section extending throughout the outer ring in the axial direction thereof) and a plurality of processing marks 5 as shown in FIG. 2 are formed on the raceway surface 2a. FIG. 2 shows a section of the outer ring taken in the radial direction thereof (vertical direction and extending throughout the outer ring in the axial direction thereof, the illustrated being exaggerated in part to show the processing marks 5 clearly.

The processing marks 5 are substantially straight and cut across each other at a predetermined angle to the circumferential direction S of the raceway surface 2a. Specifically, they are cut at a crossing angle θ in the range from 90° to 150° to the circumferential direction S of the raceway surface 2a. Further, the surface roughness of the outer ring raceway surface 2a is kept in the range from 0.15 to 0.4 μmRa in terms of average roughness at the centerline thereof in both of the radial direction A and the circumferential direction S. A difference in surface roughness between measurements in the axial direction A and the circumferential direction S is kept at 0.1 μmRa or less. Skewness (Rsk) is set at −0.4 or less. The roughness of the inner ring is set at 0.1 μmRa or less.

The above-described set values are optimum values obtained through experiments. When the crossing angle θ of the processing marks 5 is less than 90°, the surface roughness in the axial direction A is excessively higher than the surface roughness in the circumferential direction S, and the difference in surface roughness between measurements in the axial direction A and the circumferential direction S set as described above cannot be kept at 0.1 μmRa or less.

In the case of a crossing angle θ exceeding 150°, the surface roughness in the circumferential direction A is excessively higher than the surface roughness in the axial direction A, and the difference in surface roughness between measurements in the axial direction A and the circumferential direction S set as described above cannot be kept at 0.1 μmRa or less.

When the set value of surface roughness is 0.15 μmRa or less, the occurrence of excessive negative skew of the rollers cannot be prevented because there is only a small difference from the surface roughness of the inner ring. When the roughness is higher than 0.4 μmRa, high heat is generated by friction, and seizure occurs in the worst case.

When there is a big difference in surface roughness between measurements in the axial direction A and the circumferential direction S, it is difficult to control skew of the rollers.

When skewness (Rsk) is set at −0.4 or less, even if the oil film runs out, since a resultant load is supported by a multiplicity of microscopic protrusions 6 obtained by forming the processing marks 5, any significant concentration of stress can be avoided.

Figure 3:
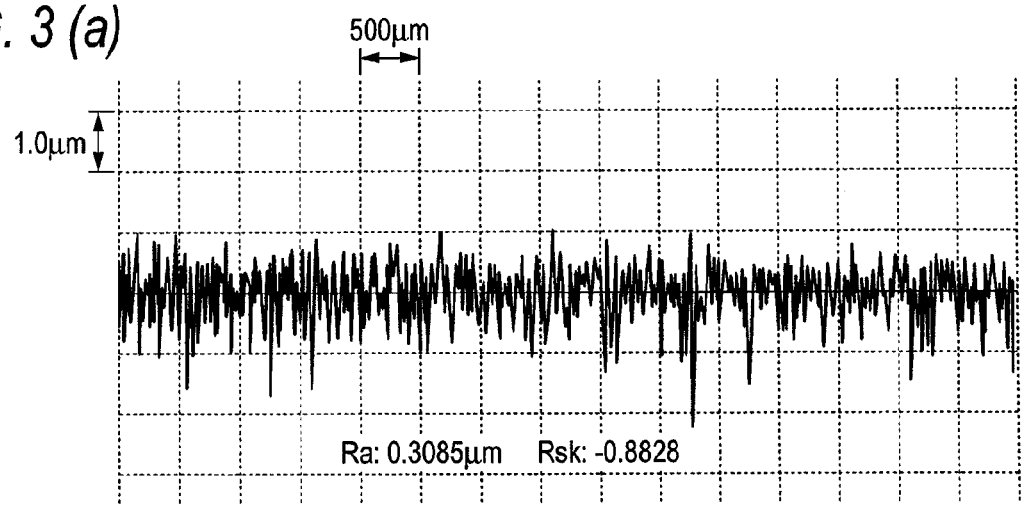
FIGS. 3(a) to (c) are graphs showing roughness of a slot (in the axial direction thereof) according to an inventive method of processing, FIGS. 3(a), (b), and (c) showing surface roughness of a left side, a central part, and a right side of a raceway surface, respectively.
Figure 3:
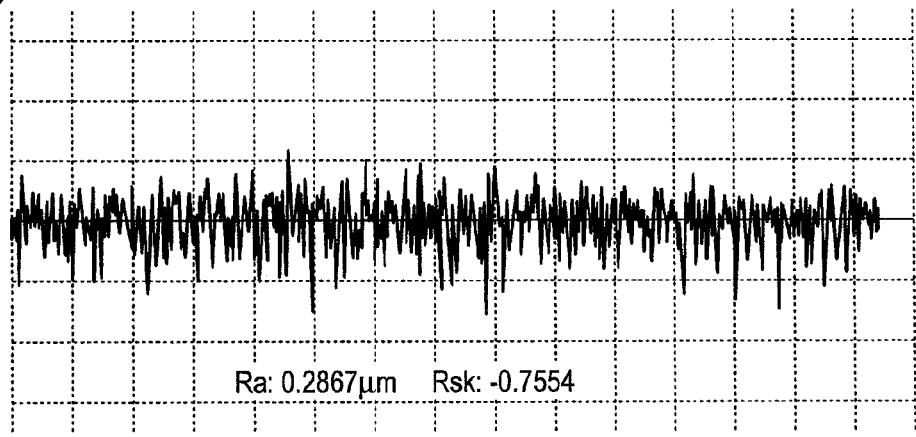
Figure 3:
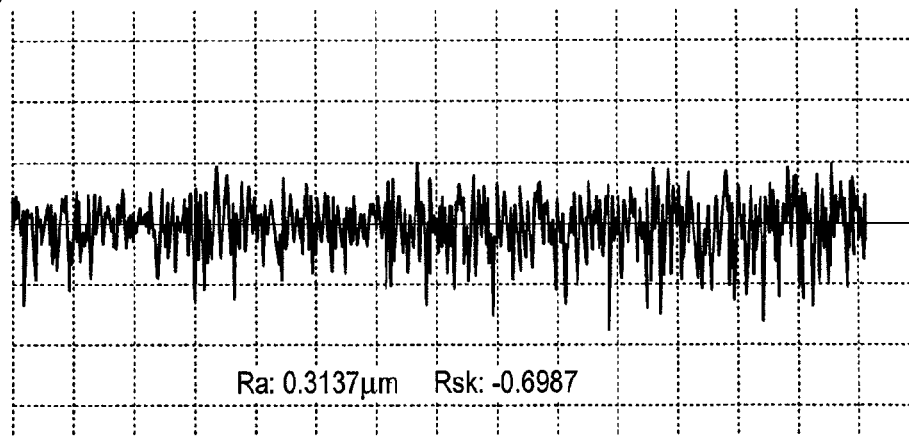
Figure 4:
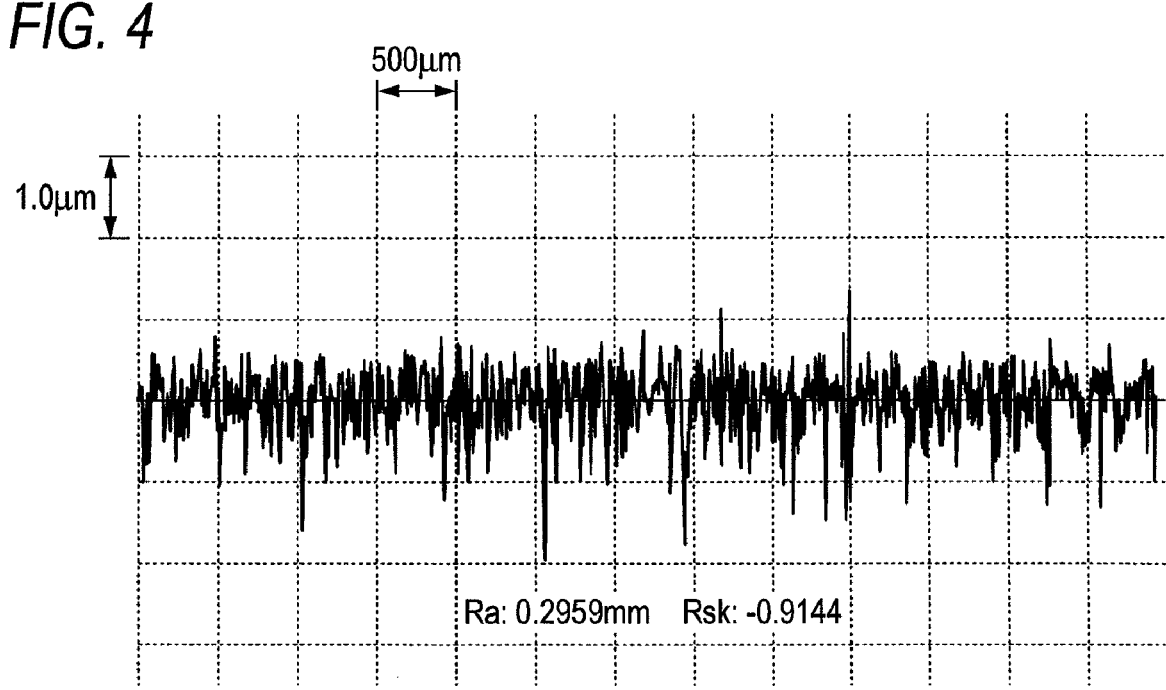
FIG. 4 is a graph showing the roughness of the slot (in the circumferential direction thereof) according to the inventive method of processing.

In the present embodiment, the processing marks 5 cross each other, and the crossing angle θ is 120°. The surface roughness of the processed surface is measured at approximately 0.3 μmRa in both of the axial direction A and the circumferential direction S (FIGS. 3(a) to (c), and FIG. 4). FIGS. 3(a), (b), and (c) are graphs showing surface roughness at a left end of the raceway surface 2a, a central part of the raceway surface 2a, and a right end of the raceway surface 2a, respectively. FIG. 4 is a graph showing surface roughness in the circumferential direction. Those graphs indicate that the surface roughness of the raceway surface 2a is substantially constant in both of the axial direction A and the circumferential direction S. The skewness (Rsk) is −0.4 or less.

The processing marks 5 formed on the outer ring raceway surface 2a of such a self-aligning roller bearing are formed by using super-finishing.

Figure 9:
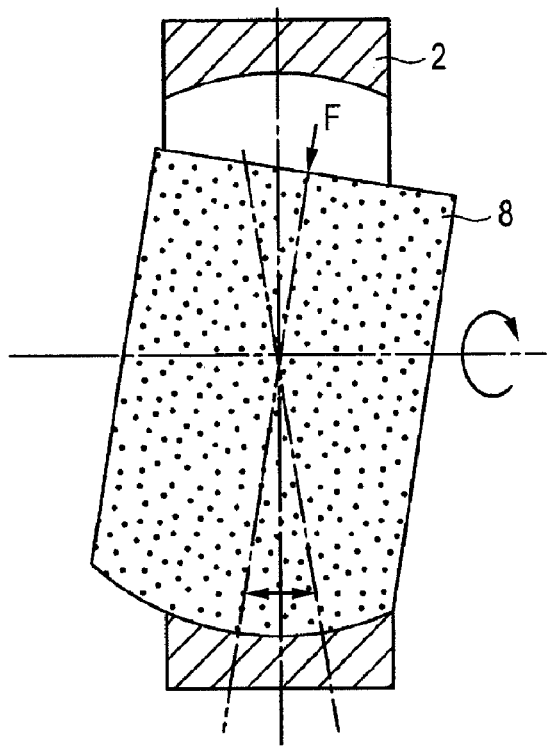
FIG. 9 is a schematic illustration of a super-finishing process according to the invention.

FIG. 9 shows an example of super-finishing of the outer ring raceway surface. A bar-shaped grindstone 8 is pressed (the pressing device is not shown) against the raceway surface of the outer ring 2 from above while the outer ring is supported and rotated by a rotary jig (not shown), and processing is performed by swinging the grindstone 8 in the axial direction along the curvature of the raceway surface.

Figure 10:
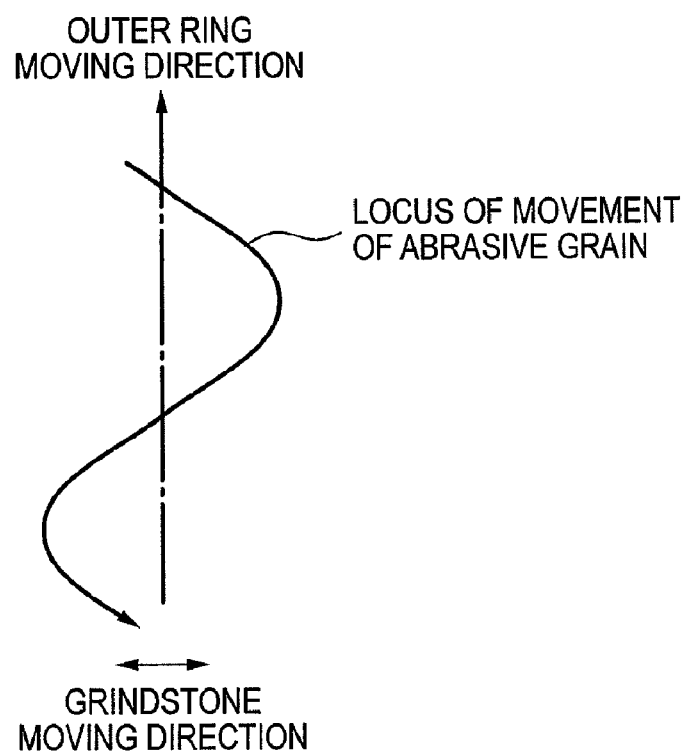
FIG. 10 shows a locus of movement of an abrasive grain.

A locus of movement of one abrasive grain of the grindstone 8 can be represented by a sine wave as shown in FIG. 10. Since the grindstone includes countless abrasive grains, processing marks 5 are formed on the outer ring raceway surface when the speed of rotation of the outer ring and the number of swings of grindstone are set at an appropriate ratio.

An appropriate machine tool known in the prior art is selected and used as the supper-finishing machine used for the super-finishing within the scope of the invention.

Figure 6:
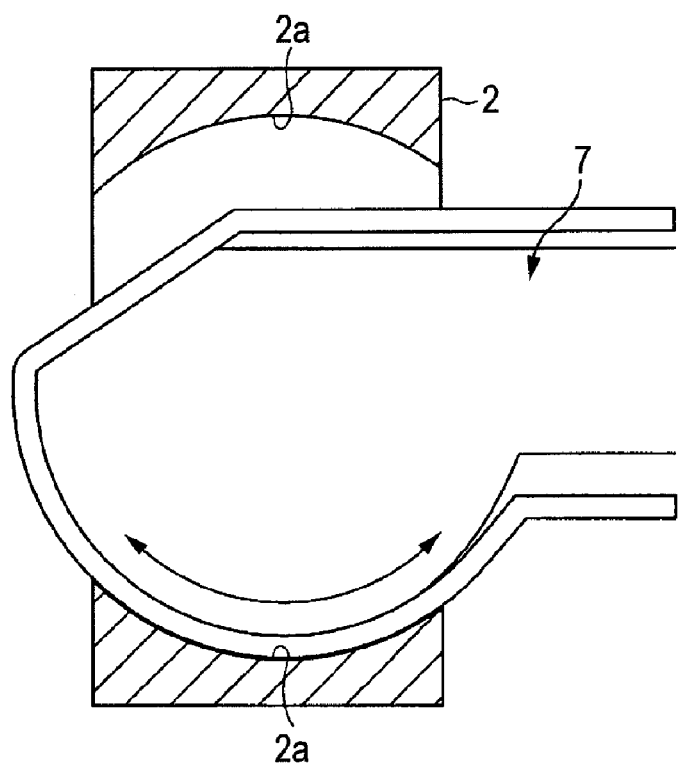
FIG. 6 is a schematic view showing an embodiment of a method of processing employing a tape process.
Figure 7:
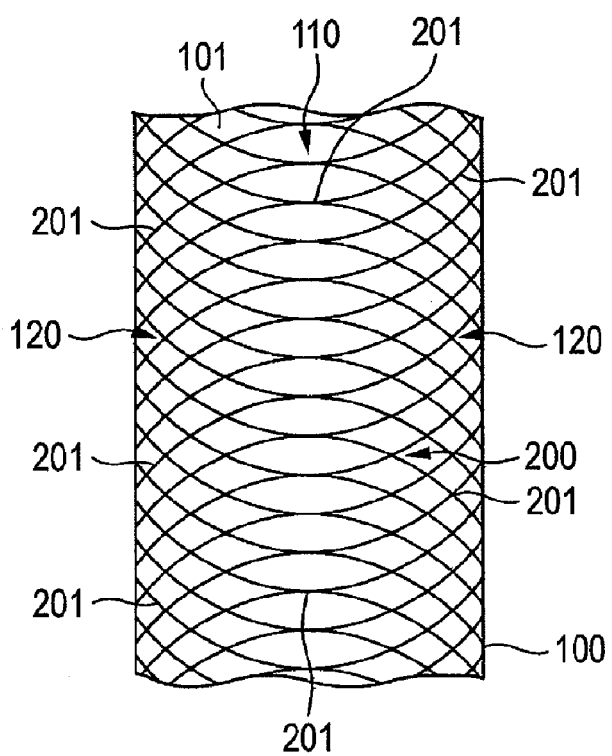
FIG. 7 is a schematic illustration of processing marks on a raceway surface of an outer ring formed by a method of processing in the prior art.

FIG. 6 shows an embodiment utilizing tape processing. This embodiment employs no grindstone but employs a pressing jig 7 having a tip in the same shape as the arcuate shape of a grindstone and an abrasive tape which is tightly attached to the tip of the jig.

An abrasive material is applied to one side or abrading surface of the abrasive tape, and processing is performed by swinging the pressing jig 7 and the abrasive tape integrally with each other along the curvature of the raceway surface with the abrasive tape pressed against the raceway surface by the pressing jig 7.

Figure 5:
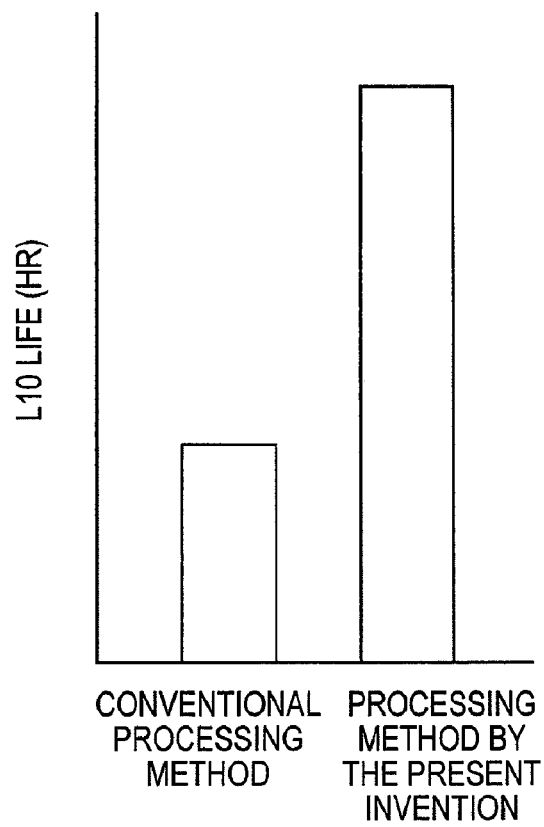
FIG. 5 shows results of a left test.

FIG. 5 shows results of a rolling fatigue life test. The results indicate that a self-aligning roller bearing having an outer ring processed using the inventive method of processing has an L10 life ratio much higher than that of a self-aligning roller bearing having an outer ring processed using a method of processing in the related art (a conventional product) and has a life several times longer than that of the conventional product.

While the invention has been described in detail and by referring to a particular embodiment of the same, it will be apparent to those skilled in the art that various changes and modifications may be made without departing from the spirit and scope of the invention.

The present application is based on an application for Japanese patent (No. 2003-324011) made on Sep. 17, 2003, the contents of which are incorporated herein for reference.

INDUSTRIAL APPLICABILITY

The invention may be applied to self-aligning roller bearings used as roll-neck bearing of various types, bearing for vehicles, bearings for various industrial purposes, and the like.

The invention claimed is:

1. A self-aligning roller bearing comprising:
an inner ring having a double-row raceway;
an outer ring having a double-row integral and spherical raceway;
a plurality of rollers incorporated between the inner ring raceway and the outer ring raceway on a double-row basis; and
a retainer for rotatably retaining the rollers, wherein:
processing marks crossing each other are formed on a raceway surface of the spherical raceway of the outer ring;
the processing marks are substantially straightly cut at a predetermined crossing angle to the circumferential direction of the raceway surface,
the surface roughness of the raceway surface of the outer ring is in the range from 0.15 to 0.4 μmRa in terms of average roughness at the centerline thereof in both of the radial direction and the circumferential direction at least at portions in contact with the rollers,
a difference in surface roughness between measurements in the axial direction and the circumferential direction is 0.1 μmRa or less,
skewness (Rsk) is −0.4 or less, and
the roughness of a raceway surface of the inner ring is 0.1 μmRa or less in terms of average roughness at the centerline in the axial direction thereof.

2. The self-aligning roller bearing according to claim 1, wherein the processing marks are cut at a crossing angle in the range from 90° to 150° to the circumferential direction of the raceway surface.

* * * * *